United States Patent
Lin et al.

(10) Patent No.: US 12,481,300 B2
(45) Date of Patent: Nov. 25, 2025

(54) POWER MANAGEMENT INTEGRATED CIRCUIT (PMIC) AND POWER MANAGEMENT SYSTEM

(71) Applicant: Richtek Technology Corporation, Hsinchu (TW)

(72) Inventors: Cheng-Han Lin, Hsinchu (TW); Chan-Chuan Li, Yunlin (TW); Bo-Zhou Ke, Changhua (TW); Chun-Yao Huang, Tainan (TW); Cheng-Hao Tseng, New Taipei (TW)

(73) Assignee: Richtek Technology Corporation, Hsinchu (TW)

( * ) Notice: Subject to any disclaimer, the term of this patent is extended or adjusted under 35 U.S.C. 154(b) by 206 days.

(21) Appl. No.: 18/410,970

(22) Filed: Jan. 11, 2024

(65) Prior Publication Data
US 2025/0079270 A1 Mar. 6, 2025

(30) Foreign Application Priority Data
Aug. 30, 2023 (TW) .................. 112132899

(51) Int. Cl.
*G05F 1/577* (2006.01)
*G05F 1/56* (2006.01)
*G05F 1/575* (2006.01)
*G06F 1/26* (2006.01)
*H02M 3/00* (2006.01)
(Continued)

(52) U.S. Cl.
CPC ................ *G05F 1/577* (2013.01); *G05F 1/56* (2013.01); *G05F 1/575* (2013.01); *G06F 1/26* (2013.01); *H02M 3/003* (2021.05); *H02M 3/158* (2013.01); *H02M 3/1584* (2013.01); *H05K 1/181* (2013.01)

(58) Field of Classification Search
CPC .... H02M 3/158; H02M 3/1584; H02M 3/003; H02M 3/285; H05K 1/181; H05K 1/11; H05K 1/18; G06F 1/26; G05F 1/56; G05F 1/59; G05F 1/577
See application file for complete search history.

(56) References Cited

U.S. PATENT DOCUMENTS

2022/0179437 A1* 6/2022 Lee .................. H02M 3/04
2022/0247314 A1* 8/2022 Zou ................... H02J 1/14

OTHER PUBLICATIONS

Texas Instruments, "TPS65086x Design guide", Nov. 2015 (Year: 2015).*

* cited by examiner

*Primary Examiner* — Ryan Johnson
(74) *Attorney, Agent, or Firm* — Huan-Yi Lin

(57) ABSTRACT

A power management integrated circuit (PMIC) soldered onto a printed circuit board, includes: a first output stage circuit and a second output stage circuit. In a separate power supply configuration, first and second current inflow pins of the first and second output stage circuits are soldered to first and second current inflow printed lines, respectively, wherein the first and second current inflow printed lines are not directly electrically connected to each other; and, first and second current outflow pins of the first and second output stage circuits are soldered to first and second current outflow printed lines respectively, wherein the first and second current outflow printed lines are not directly electrically connected to each other. In a cooperation power supply configuration, the first and second current inflow pins are both soldered to a common current inflow printed line of the PCB, to be electrically connected with each other.

18 Claims, 7 Drawing Sheets

(51) Int. Cl.
*H02M 3/158* (2006.01)
*H05K 1/18* (2006.01)

POWER MANAGEMENT INTEGRATED CIRCUIT (PMIC) AND POWER MANAGEMENT SYSTEM

CROSS REFERENCE

The present invention claims priority to the TW patent application Ser. No. 112132899, filed on Aug. 30, 2023.

BACKGROUND OF THE INVENTION

Field of Invention

The present invention relates to a power management integrated circuit (PMIC) as well as a power management system; particularly, it relates to such PMIC and such power management system, which can efficiently arrange the space of a printed circuit board (PCB) and are well able to fulfill different demands for different corresponding powers.

Description of Related Art

FIG. 1A and FIG. 1B show schematic circuit block diagrams of a conventional power management system, in two different layouts. The conventional power management system 10 shown in FIG. 1A includes: a power management integrated circuit (PMIC) 11 and a printed circuit board (PCB) 12, whereas, the conventional power management system 10 shown in FIG. 1B includes: a PMIC 11' and a PCB 12'. The PMIC 11 and 11' are packaged integrated circuit (IC) chips. When the power management system 10 needs to provide different combinations of different powers, and for this purpose needs to be adapted to accommodate different types of PMICs and PCBs (such as 11/11' and 12/12'), it is better for the arrangements of these components to have the same layout so that the manufacturing and inventory management costs can be held low. As a result, the power management system 10 shown in FIG. 1A and the power management system 10 shown in FIG. 1B will be arranged as shown in the figures, to have the same layout.

That is, when the power management system 10 needs to provide different combinations of powers, for example in one case to provide two different powers (FIG. 1A) and in another case to provide one single power (FIG. 1B), in order to reduce the manufacturing and inventory management costs, an extra cost of space is required in order to achieve the flexibility in inventory management and manufacturing management of the ICs and the PCBs.

In FIG. 1A, the power management system 10 includes the PMIC 11 and the PCB 12. The power management system 10 shown in FIG. 1A provides a first output power and a second output power, wherein the first output power includes a first output voltage Vout1 and a first output current Iout1, whereas, the second output power includes: a second output voltage Vout2 and a second output current Iout2, wherein for example, the current upper limit of the first output current Iout1 is 7 A, whereas, the current upper limit of the second output current Iout2 is 3 A. On the other hand, as shown in FIG. 1B, the power management system 10 includes the PMIC 11' and the PCB 12', wherein the power management system 10 provides an output power including an output voltage Vout and an output current Iout. The current upper limit of the output current Iout is for example 10 A.

The above illustrates that, a power management system having the same appearance and circuit layout can serve to provide different combinations of different output powers for different platforms.

More specifically, the platform served by the power management system 10 in FIG. 1A requires two output powers, including a first output power and second output power, wherein the first output power includes, for example, the first output voltage Vout1 and the first output current Iout1 having a current upper limit equal to 7 A, and the second output power includes, for example, the second output voltage Vout2 and the second output current Iout2 having a current upper limit equal to 3 A. On the other hand, the platform served by the power management system 10 in FIG. 1B only requires one single output power, wherein the output power includes, for example, the output voltage Vout and the output current Iout having a current upper limit equal to 10 A.

As shown in FIG. 1A, the PMIC 11 includes a buck circuit 101a and a buck circuit 101b, wherein the buck circuit 101a and the buck circuit 101b shown in FIG. 1A provide the first output power and the second output power, respectively. On the other hand, as shown in FIG. 1B, the PMIC 11' includes one single buck circuit 101c, to provide the output power. To achieve the above functions and to keep the layouts of the configurations in FIG. 1A and FIG. 1B to be the same, a conventional solution is to accommodate the buck circuit 101a in a space which is able to accommodate the buck circuit 101c having a relatively greater size, such that the layout is not only applicable to the application of a current upper limit equal to 7 A, but also applicable to the application of a current upper limit equal to 10 A, as shown in FIG. 1A. Nevertheless, this results in a requirement which is disadvantageous, that is, a "reserved space" as shown in FIG. 1A is required in order to reserve a space that is required by the application of a current upper limit equal to 10 A. On the other hand, in the application of a current upper limit equal to 10 A, the power management system 10 is only required to provide one output power, wherein as shown in FIG. 1B, only one buck circuit 101c is needed, but the space corresponding to the buck circuit 101b in FIG. 1A is completely wasted. Consequently, either in the case of FIG. 1A or in the case of FIG. 1B, a "reserved space" causing an inefficient use of the space is a problem, resulting in an increase of the area and volume.

In view of the above, to overcome the drawbacks in the prior art, the present invention proposes a power management integrated circuit (PMIC) as well as a power management system, which can efficiently arrange the space of the PCB and are well able to fulfill different demands for different corresponding powers.

SUMMARY OF THE INVENTION

From one perspective, the present invention provides a power management integrated circuit (PMIC), which is soldered onto a printed circuit board (PCB); the PMIC comprising: a first output stage circuit; and a second output stage circuit; wherein in a separate power supply configuration, a first current inflow pin of the first output stage circuit and a second current inflow pin of the second output stage circuit are soldered to a first current inflow printed line of the PCB and a second current inflow printed line of the PCB, respectively, wherein the first current inflow printed line and the second current inflow printed line of the PCB are not directly electrically connected to each other, whereas, a first current outflow pin of the first output stage circuit and a second current outflow pin of the second output stage circuit are soldered to a first current outflow printed line of the PCB and a second current outflow printed line of the PCB, respectively, wherein the first current outflow printed line and the second current outflow printed line of the PCB are not directly electrically connected to each other; and wherein a first device and a second device are configured to operably generate a first output power corresponding to the first current outflow pin and a second output power corresponding to the second current outflow pin according to a first input power corresponding to the first current inflow pin and a second input power corresponding to the second current inflow pin, respectively, wherein a current upper limit of the first output power and a current upper limit of the second output power are a first maximum output current and a second maximum output current, respectively; wherein in a cooperation power supply configuration, the first current inflow pin and the second current inflow pin are both soldered to a common current inflow printed line of the PCB, so that the first current inflow pin and the second current inflow pin are electrically connected with each other, whereas, the first current outflow pin and the second current outflow pin are both soldered to a common current outflow printed line of the PCB, so that the first current outflow pin and the second current outflow pin are electrically connected with each other, whereby the first device and the second device are connected in parallel to each other, and whereby the first output stage circuit and the second output stage circuit constitute a cooperation output stage circuit, which is configured to operably generate a common output power, wherein a current upper limit of common output power is a sum of the first maximum output current plus the second maximum output current; wherein a first current inflow end and a first current outflow end of the first device respectively correspond to the first current inflow pin and the first current outflow pin, whereas, a second current inflow end and a second current outflow end of the second device respectively correspond to the second current inflow pin and the second current outflow pin.

From another perspective, the present invention provides a power management system, comprising: a power management integrated circuit (PMIC) and a printed circuit board (PCB), wherein the PMIC is soldered onto the PCB; the PMIC comprising: a first output stage circuit; and a second output stage circuit; wherein in a separate power supply configuration, a first current inflow pin of the first output stage circuit and a second current inflow pin of the second output stage circuit are soldered to a first current inflow printed line of the PCB and a second current inflow printed line of the PCB, respectively, wherein the first current inflow printed line and the second current inflow printed line of the PCB are not directly electrically connected to each other, whereas, a first current outflow pin of the first output stage circuit and a second current outflow pin of the second output stage circuit are soldered to a first current outflow printed line of the PCB and a second current outflow printed line of the PCB, respectively, wherein the first current outflow printed line and the second current outflow printed line of the PCB are not directly electrically connected to each other; and wherein a first device and a second device are configured to operably generate a first output power corresponding to the first current outflow pin and a second output power corresponding to the second current outflow pin according to a first input power corresponding to the first current inflow pin and a second input power corresponding to the second current inflow pin, respectively, wherein a current upper limit of the first output power and a current upper limit of the second output power are a first maximum output current and a second maximum output current, respectively; wherein in a cooperation power supply configuration, the first current inflow pin and the second current inflow pin are both soldered to a common current inflow printed line of the PCB, so that the first current inflow pin and the second current inflow pin are electrically connected with each other, whereas, the first current outflow pin and the second current outflow pin are both soldered to a common current outflow printed line of the PCB, so that the first current outflow pin and the second current outflow pin are electrically connected with each other, whereby the first device and the second device are connected in parallel to each other, and whereby the first output stage circuit and the second output stage circuit constitute a cooperation output stage circuit, which is configured to operably generate a common output power, wherein a current upper limit of common output power is a sum of the first maximum output current plus the second maximum output current; wherein a first current inflow end and a first current outflow end of the first device respectively correspond to the first current inflow pin and the first current outflow pin, whereas, a second current inflow end and a second current outflow end of the second device respectively correspond to the second current inflow pin and the second current outflow pin.

In one embodiment, both the common current inflow printed line and the common current outflow printed line are situated below the PMIC, and both the common current inflow printed line and the common current outflow printed line are situated between the PMIC and the PCB.

In one embodiment, the common current inflow printed line and/or the common current outflow printed line is situated on and in contact with an uppermost surface of the PCB.

In one embodiment, both the first current inflow pin and the second current inflow pin are situated on a same plane, such that the common current inflow printed line is situated on and in contact with the uppermost surface of the PCB, and/or, wherein both the first current outflow pin and the second current outflow pin are situated on a same plane, such that the common current outflow printed line is situated on and in contact with the uppermost surface of the PCB.

In one embodiment, along a width direction of the PMIC, the first current inflow pin and the second current inflow pin are respectively situated on two sides of the PMIC, and, along a length direction of the PMIC, the first current inflow pin and the second current inflow pin are aligned to each other, so that the common current inflow printed line is situated on and in contact with the uppermost surface of the PCB, and/or, wherein along the width direction of the PMIC, the first current outflow pin and the second current outflow pin are respectively situated on two sides of the PMIC, and, along the length direction of the PMIC, the first current outflow pin and the second current outflow pin are aligned to each other, so that the common current outflow printed line is situated on and in contact with the uppermost surface of the PCB.

In one embodiment, along a length direction of the PMIC, the common current inflow printed line is aligned with the first current inflow pin and the second current inflow pin which are situated on the same plane, and/or, along a length direction of the PMIC, the common current outflow printed line is aligned with the first current outflow pin and the second current outflow pin which are situated on the same plane.

In one embodiment, each of the first output stage circuit and the second output stage circuit is a linear power converter circuit, wherein: in the separate power supply configuration, the first device and the second device correspond to a first transistor and a second transistor, respectively, wherein the first device and the second device are configured to operably generate the first output power and the second output power in accordance with a first feedback signal of the first output power and a second feedback signal of the second output power to achieve linear regulation, respectively; and in the cooperation power supply configuration, the first device and the second device are connected in parallel to constitute a common transistor, wherein the common transistor is configured to operably generate the common output power according to a common feedback signal of the common output power to achieve linear regulation.

In one embodiment, each of the first output stage circuit and the second output stage circuit is a switching output stage circuit, wherein: in the separate power supply configuration, each of the first device and the second device includes: a corresponding high side switch and a corresponding low side switch; wherein the high side switch of the first device is configured to operably drive a driver circuit and/or a current detection circuit corresponding to the first device, whereas, the low side switch of the first device is configured to operably drive a driver circuit and/or a current detection circuit corresponding to the first device; wherein the high side switch of the second device is configured to operably drive a driver circuit and/or a current detection circuit corresponding to the second device, whereas, the low side switch of the second device is configured to operably drive a driver circuit and/or a current detection circuit corresponding to the second device; wherein the high side switch and the low side switch of the first device is configured to operably control a corresponding first inductor according to a first feedback signal of the first output power, thus generating the first output power; wherein the high side switch and the low side switch of the second device is configured to operably control a corresponding second inductor according to a second feedback signal of the second output power, thus generating the second output power; and in the cooperation power supply configuration, the first device and the second device are configured to operably control an inductor in accordance with a common feedback signal of the common output power, thus generating the common output power.

In one embodiment, in the separate power supply configuration, via the first current inflow printed line and the first current outflow printed line, respectively, the first current inflow pin and the first current outflow pin are electrically connected to a first input voltage and a first switching node, respectively, whereas, via the second current inflow printed line and the second current outflow printed line, respectively, the second current inflow pin and the second current outflow pin are electrically connected to a second input voltage and a second switching node, respectively; and in the cooperation power supply configuration, via the common current inflow printed line and the common current outflow printed line, respectively, the first current inflow pin and the first current outflow pin are electrically connected to a common input voltage and a common switching node, respectively, whereas, via the common current inflow printed line and the common current outflow printed line, respectively, the second current inflow pin and the second current outflow pin are electrically connected to the common input voltage and the common switching node, respectively.

The present invention is advantageous over the prior art, in that: the present invention can efficiently arrange the space of the PCB and are well able to fulfill different demands for different corresponding powers.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
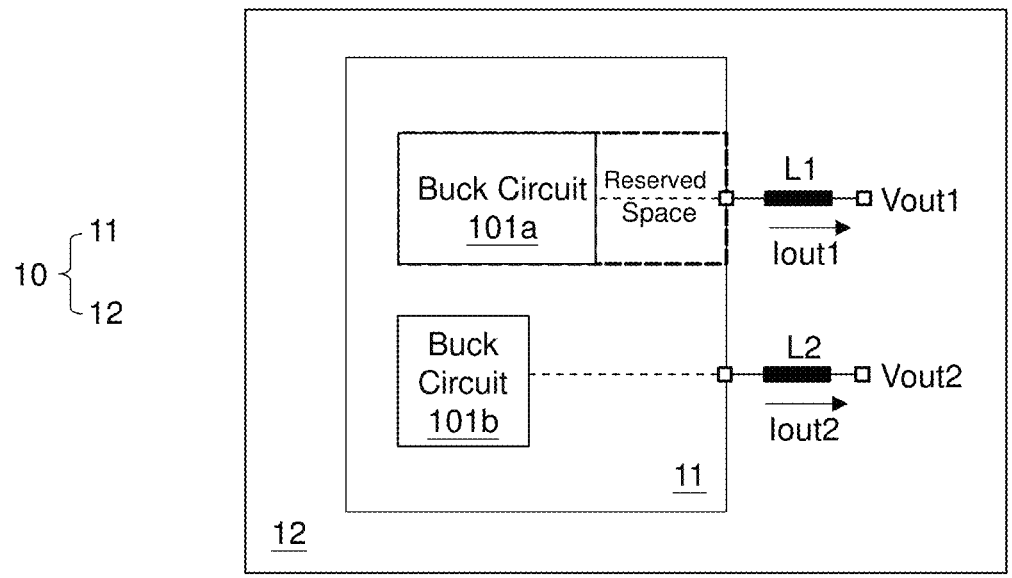
FIG. 1A and FIG. 1B show schematic circuit block diagrams of a conventional power management system, in two different layouts.
Figure 1B:
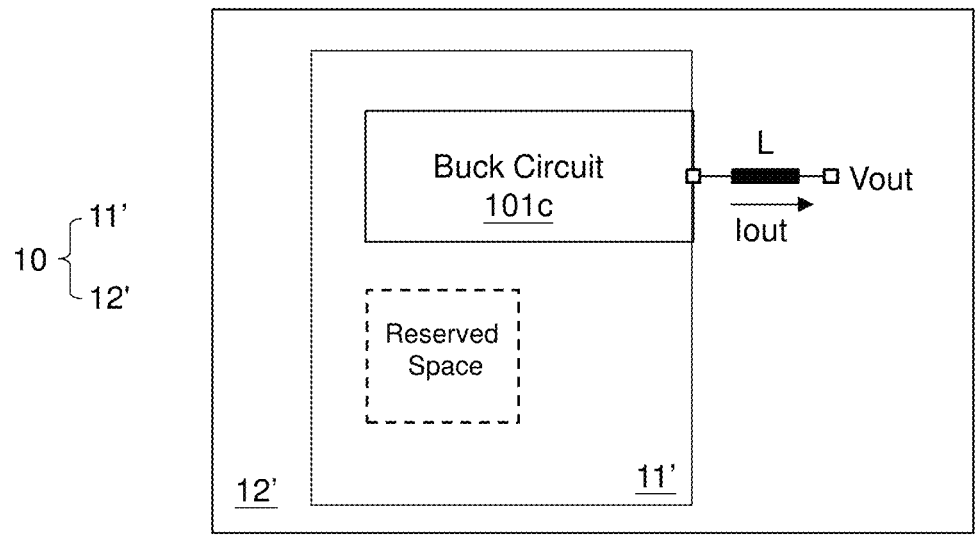
Figure 2A:
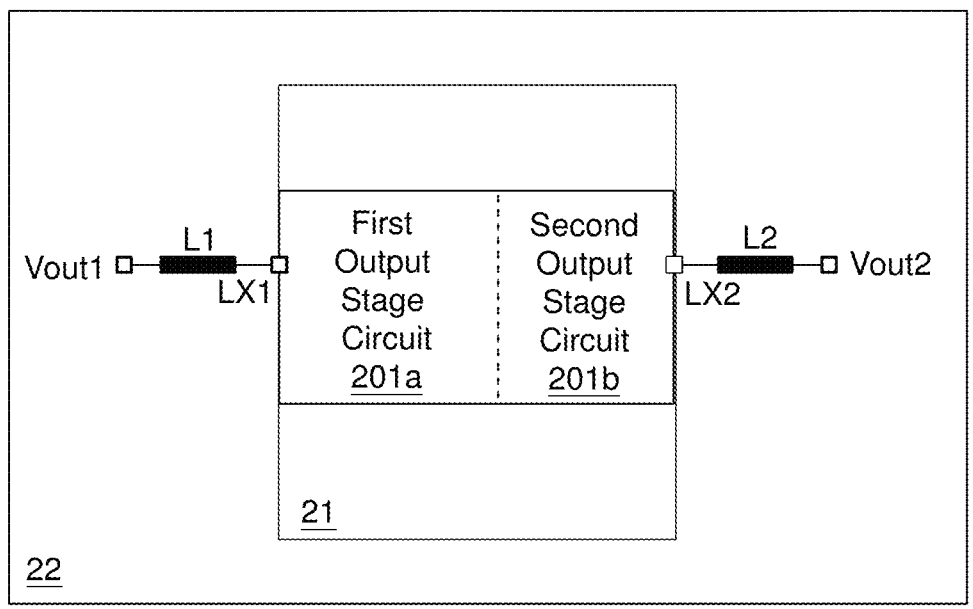
FIG. 2A and FIG. 2B show schematic circuit block diagrams of a power management system according to an exemplary embodiment of the present invention, for two different applications but having the same layout configuration.
Figure 2B:
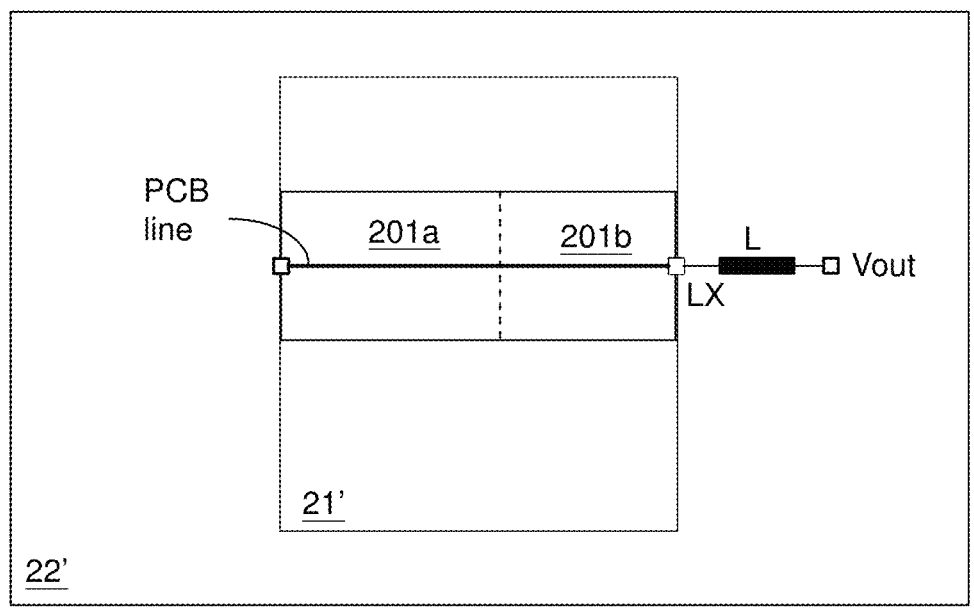

FIG. 2A and FIG. 2B show schematic circuit block diagrams of a power management system according to an exemplary embodiment of the present invention, for two different applications but having the same layout configuration. As shown in FIG. 2A and FIG. 2B, the power management system 20 shown in FIG. 2A includes: a power management integrated circuit (PMIC) 21 and a printed circuit board (PCB) 22, whereas, the power management system 20 shown in FIG. 2B includes: a PMIC 21' and a PCB 22'. The PMIC 21 shown in FIG. 2A and the PMIC 21' shown in FIG. 2B are both packaged IC chips. Each of the PMIC 21 shown in FIG. 2A and the PMIC 21' shown in FIG. 2B comprises a first output stage circuit 201a and a second output stage circuit 201b. To be more specific, in this embodiment, the first output stage circuit 201a includes a first device, whereas, the second output stage circuit 201b includes a second device. As shown in FIG. 2A, in one embodiment, the first output stage circuit 201a and the second output stage circuit 201b are integrated into the PMIC 21 or 21'. In detail, FIG. 2A is an embodiment wherein the power management system 20 operates in a separate power supply configuration, whereas, FIG. 2B is an embodiment wherein the power management system 20 operates in a cooperation power supply configuration. As shown by the separate power supply configuration in FIG. 2A, the first output stage circuit 201a and one end of an inductor L1 are coupled to a switching node LX1, while another end of the inductor L1 is coupled to a first output power Vout1; the second output stage circuit 201b and one end of an inductor L2 are coupled to a switching node LX2, while another end of the inductor L2 is coupled to a second output power Vout2. As shown by the cooperation power supply configuration in FIG. 2B, the switching node LX1 and the switching node LX2 shown in FIG. 2A are electrically connected by a PCB line to become one switching node LX shown in FIG. 2B, and the switching node LX is coupled to an inductor L.

Figure 3A:
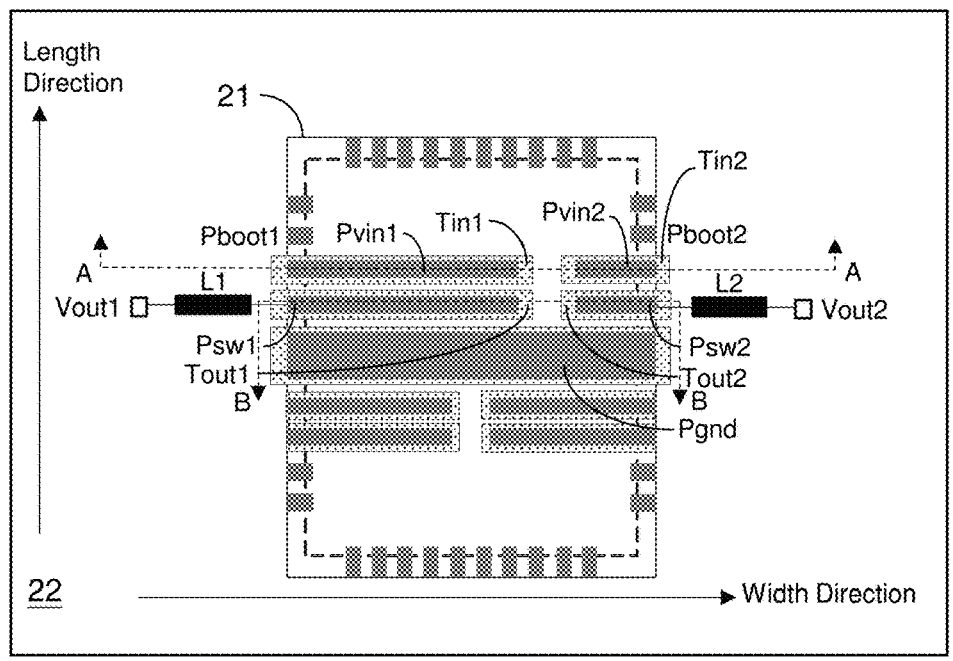
FIG. 3A and FIG. 3B show bottom views of a power management system according to an exemplary embodiment of the present invention, in correspondence to FIG. 2A and FIG. 2B, respectively.
Figure 3B:
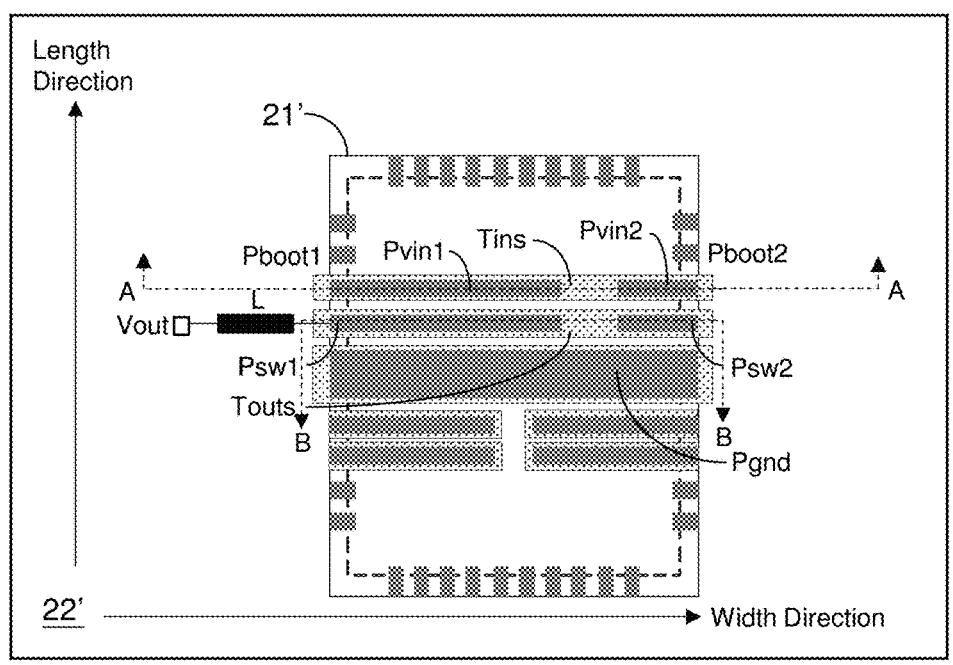
Figure 4A:
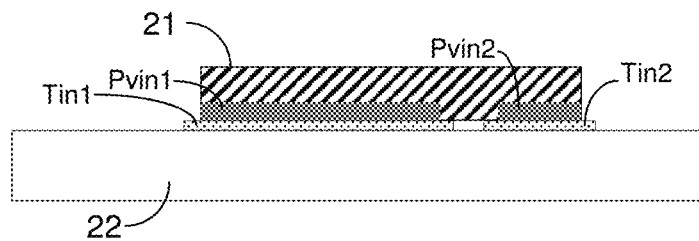
FIG. 4A and FIG. 4B are cross-sectional views of the power management system shown in FIG. 3A, respectively taken along line A-A and line B-B of FIG. 3A, according to an exemplary embodiment of the present invention.
Figure 4B:
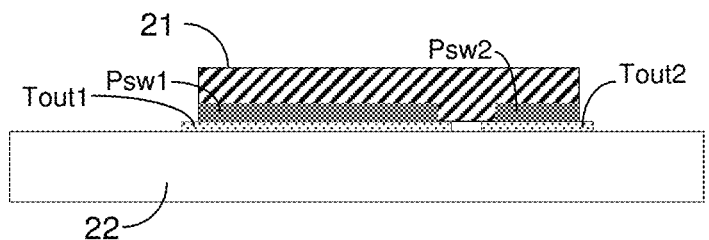
Figure 4C:
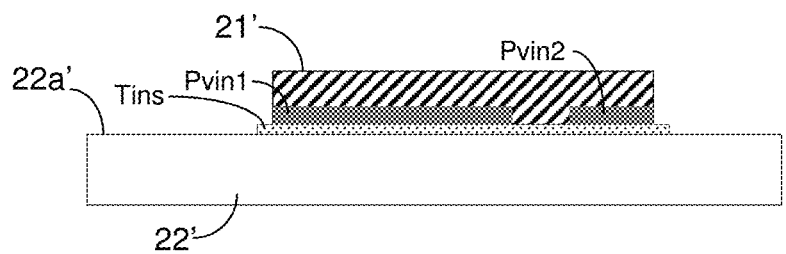
FIG. 4C and FIG. 4D are cross-sectional views of the power management system shown in FIG. 3B, respectively taken along line A-A and line B-B of FIG. 3B, according to an exemplary embodiment of the present invention.
Figure 4D:
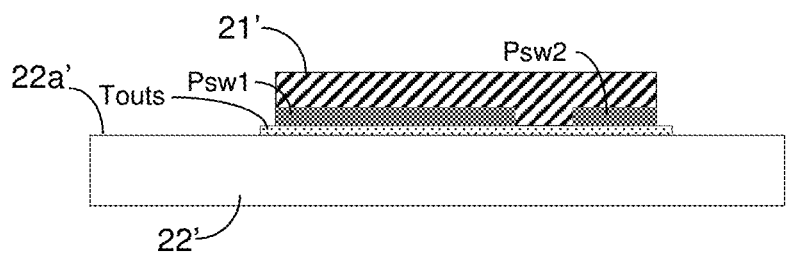

FIG. 3A and FIG. 3B show bottom views of a power management system according to an exemplary embodiment of the present invention, wherein FIG. 3A is the bottom view of the power management system corresponding to the power management system shown in FIG. 2A, whereas, FIG. 3B is the bottom view of the power management system corresponding to the power management system shown in FIG. 2B. FIG. 4A and FIG. 4B are cross-sectional views of the power management system shown in FIG. 3A, respectively taken along line A-A and line B-B of FIG. 3A, according to an exemplary embodiment of the present invention. FIG. 4C and FIG. 4D are cross-sectional views of the power management system shown in FIG. 3B, respectively taken along line A-A and line B-B of FIG. 3B, according to an exemplary embodiment of the present invention. FIG. 3A, FIG. 4A and FIG. 4B shows the power management system 20 which operates in a separate power supply configuration, whereas, FIG. 3B, FIG. 4C and FIG. 4D shows the power management system 20 which operates in a cooperation power supply configuration. In these embodiments, each of the first output stage circuit 201a and the second output stage circuit 201b is a switching output stage circuit.

As shown in FIG. 3A and FIG. 4A, in the separate power supply configuration, a first current inflow pin Pvin1 of the first output stage circuit 201a and a second current inflow pin Pvin2 of the second output stage circuit 201b are soldered to a first current inflow printed line Tin1 of the PCB 22 and a second current inflow printed line Tin2 of the PCB 22, respectively, wherein the first current inflow printed line Tin1 and the second current inflow printed line Tin2 of the PCB 22 are not directly electrically connected to each other. As shown in FIG. 3A and FIG. 4B, in the separate power supply configuration, a first current outflow pin Psw1 of the first output stage circuit 201a and a second current outflow pin Psw2 of the second output stage circuit 201b are soldered to a first current outflow printed line Tout1 of the PCB 22 and a second current outflow printed line Tout2 of the PCB 22, respectively, wherein the first current outflow printed line Tout1 and the second current outflow printed line Tout2 of the PCB 22 are not directly electrically connected to each other. In this embodiment, the first device and the second device are configured to operably generate a first output power Vout1 and a second output power Vout2 according to a first input power and a second input power, respectively, wherein a current upper limit of the first output power Vout1 and a current upper limit of the second output power Vout2 are a first maximum output current and a second maximum output current, respectively.

As shown in FIG. 3B, FIG. 4C and FIG. 4D, in the cooperation power supply configuration, the first current inflow pin Pvin1 of the first output stage circuit 201a and the second current inflow pin Pvin2 of the second output stage circuit 201b are both soldered to a common current inflow printed line Tins of a PCB 22', so that the first current inflow pin Pvin1 of the first output stage circuit 201a and the second current inflow pin Pvin2 of the second output stage circuit 201b are electrically connected with each other, whereas, the first current outflow pin Psw1 of the first output stage circuit 201a and the second current outflow pin Psw2 of the second output stage circuit 201b are both soldered to a common current outflow printed line Touts of the PCB 22', so that the first current outflow pin Psw1 of the first output stage circuit 201a and the second current outflow pin Psw2 of the second output stage circuit 201b are electrically connected with each other, whereby the first device and the second device are connected in parallel to each other; thus, the first output stage circuit 201a and the second output stage circuit 201b work in cooperation to constitute one cooperation output stage circuit, which is configured to operably generate a common output power Vout, wherein a current upper limit of common output power Vout is a sum of the first maximum output current plus the second maximum output current. Please refer to FIG. 6 along with FIG. 3A, FIG. 4A and FIG. 4B; the first current inflow end Tvin1 and the first current outflow end Tsw1 of the first device in FIG. 6 respectively correspond to the first current inflow pin Pvin1 and the first current outflow pin Psw1, whereas, the second current inflow end Tvin2 and the second current outflow end Tsw2 of the second device in FIG. 6 respectively correspond to the second current inflow pin Pvin2 and the second current outflow pin Psw2.

As shown in FIG. 3B, FIG. 4C and FIG. 4D, in the cooperation power supply configuration, both the first current inflow pin Pvin1 and the second current inflow pin Pvin2 are situated on a same plane, such that the common current inflow printed line Tins is situated on and in contact with the uppermost surface 22a' of the PCB 22', and/or, both the first current outflow pin Psw1 and the second current outflow pin Psw2 are situated on a same plane, such that the common current outflow printed line Touts is situated on and in contact with the uppermost surface 22a' of the PCB.

As shown in FIG. 3B, in the cooperation power supply configuration, along a width direction of the PMIC 21', the first current inflow pin Pvin1 and the second current inflow pin Pvin2 are respectively situated on two sides of the PMIC 21', and, along a length direction of the PMIC 21', the first current inflow pin Pvin1 and the second current inflow pin Pvin2 are aligned to each other, so that the common current inflow printed line Tins is situated on and in contact with the uppermost surface 22a' of the PCB 22', and/or, along the width direction of the PMIC 21', the first current outflow pin Psw1 and the second current outflow pin Psw2 are respectively situated on two sides of the PMIC 21', and, along the length direction of the PMIC 21', the first current outflow pin Psw1 and the second current outflow pin Psw2 are aligned to each other, so that the common current outflow printed line Touts is situated on and in contact with the uppermost surface of the PCB 22'.

As shown in FIG. 3B, along a length direction of the PMIC 21', the first current inflow pin Pvin1 and the second current inflow pin Pvin2 are aligned to each other, and/or, along the length direction of the PMIC 21', the first current outflow pin Psw1 and the second current outflow pin Psw2 are aligned to each other.

As shown by the separate power supply configuration in FIG. 3A, FIG. 4A and FIG. 4B, in the separate power supply configuration, respectively via the first current inflow printed line Tin1 and the first current outflow printed line Tout1, the first current inflow pin Pvin1 and the first current outflow pin Psw1 are electrically connected to a first input voltage and a first switching node LX1 (referring to FIG. 2A), respectively, whereas, respectively via the second current inflow printed line Tin2 and the second current outflow printed line Tout2, the second current inflow pin Pvin2 and the second current outflow pin Psw2 are electrically connected to a second input voltage and a second switching node LX2, respectively.

As shown by the cooperation power supply configuration in FIG. 3B, FIG. 4C and FIG. 4D, in the cooperation power supply configuration, respectively via the common current inflow printed line Tins and the common current outflow printed line Touts, the first current inflow pin Pvin1 and the first current outflow pin Psw1 are electrically connected to a common input voltage and a common switching node LX (referring to FIG. 2B), respectively, whereas, respectively via the common current inflow printed line Tins and the common current outflow printed line Touts, the second current inflow pin Pvin2 and the second current outflow pin Psw2 are electrically connected to the common input voltage and the common switching node LX (referring to FIG. 2B), respectively. In one embodiment, a driver pin Pboot1 and a driver pin Pboot2 can be coupled to each other via the common current inflow printed line Tins.

As shown in FIG. 3B, FIG. 4C and FIG. 4D, in the cooperation power supply configuration, the first device and the second device are configured to operably control an inductor L in accordance with a common feedback signal of the common output power Vout, thus generating the common output power Vout.

FIG. 4A and FIG. 4B are cross-sectional views of the power management system shown in FIG. 3A, respectively taken along line A-A and line B-B of FIG. 3A, according to an exemplary embodiment of the present invention. FIG. 4C and FIG. 4D are cross-sectional views of the power management system shown in FIG. 3B, respectively taken along line A-A and line B-B of FIG. 3B, according to an exemplary embodiment of the present invention. As shown by the separate power supply configuration in FIG. 3A, FIG. 4A and FIG. 4B, the PMIC 21 is soldered onto the PCB 22, whereas, as shown by the cooperation power supply configuration in FIG. 3B, FIG. 4C and FIG. 4D, the PMIC 21' is soldered onto the PCB 22'. As shown in FIG. 4C and FIG. 4D, the common current inflow printed line Tins and the common current outflow printed line Touts are both situated below the PMIC 21' and are both situated between the PMIC 21' and the PCB 22'. The common current inflow printed line Tins and/or the common current outflow printed line Touts is situated on and in contact with an uppermost surface 22a' of the PCB 22.

Figure 5A:
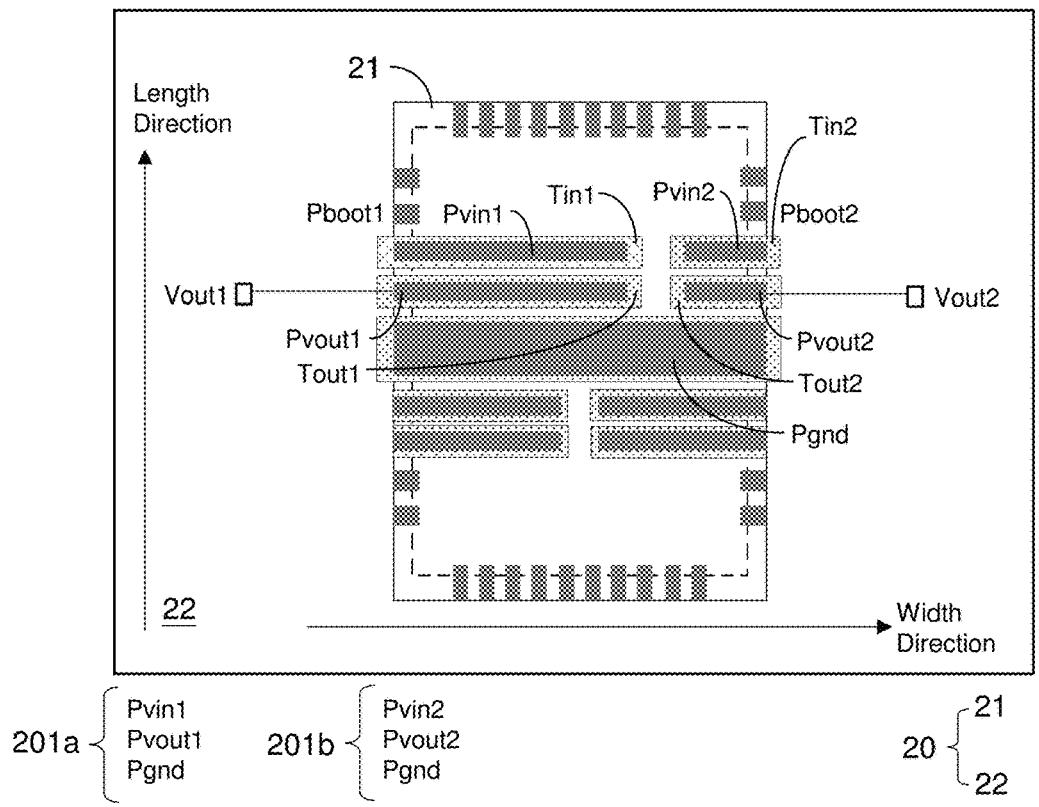
FIG. 5A and FIG. 5B show bottom views of a power management system according to another exemplary embodiment of the present invention, in correspondence to FIG. 2A and FIG. 2B, respectively.
Figure 5B:
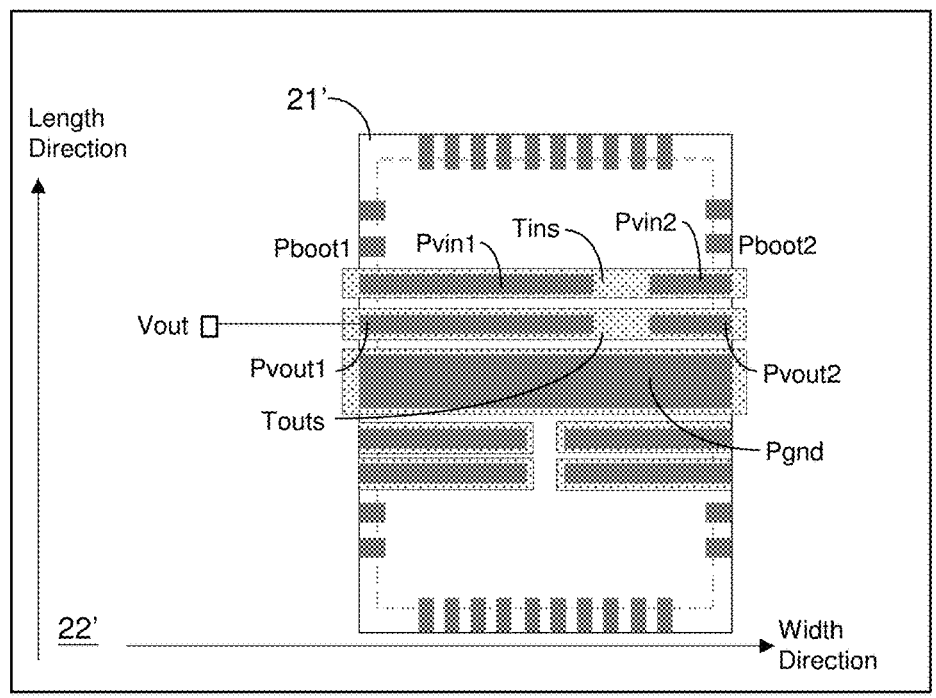

FIG. 5A and FIG. 5B show bottom views of a power management system according to another exemplary embodiment of the present invention, wherein FIG. 5A is the bottom view of the power management system corresponding to the power management system shown in FIG. 2A, whereas, FIG. 5B is the bottom view of the power management system corresponding to the power management system shown in FIG. 2B. In this embodiment, each of the first output stage circuit 201a and the second output stage circuit 201b is, for example but not limited to be, a linear power converter circuit. The power management system 20 of this embodiment shown in FIG. 5A and FIG. 5B is similar to the power management system 20 of the embodiment shown in FIG. 3A and FIG. 3B, but is different in that: first, as compared to the power management system 20 of the embodiment shown in FIG. 3A and FIG. 3B, the power management system 20 of this embodiment shown in FIG. 5A and FIG. 5B does not adopt inductors L1 and L2. Second, as compared to the power management system 20 of the embodiment shown in FIG. 3A and FIG. 3B which includes the first current outflow pin Psw1 and the second current outflow pin Psw2, the power management system 20 of this embodiment shown in FIG. 5A and FIG. 5B includes a first current outflow pin Pvout1 and a second current outflow pin Pvout2. Other than the foregoing differences between the power management system 20 of this embodiment shown in FIG. 5A and FIG. 5B and the power management system 20 of the embodiment shown in FIG. 3A and FIG. 3B, the rest components in the power management system 20 of this embodiment shown in FIG. 5A and FIG. 5B are similar to the components in the power management system 20 of the embodiment shown in FIG. 3A and FIG. 3B, so the details thereof are not redundantly repeated here.

Figure 6:
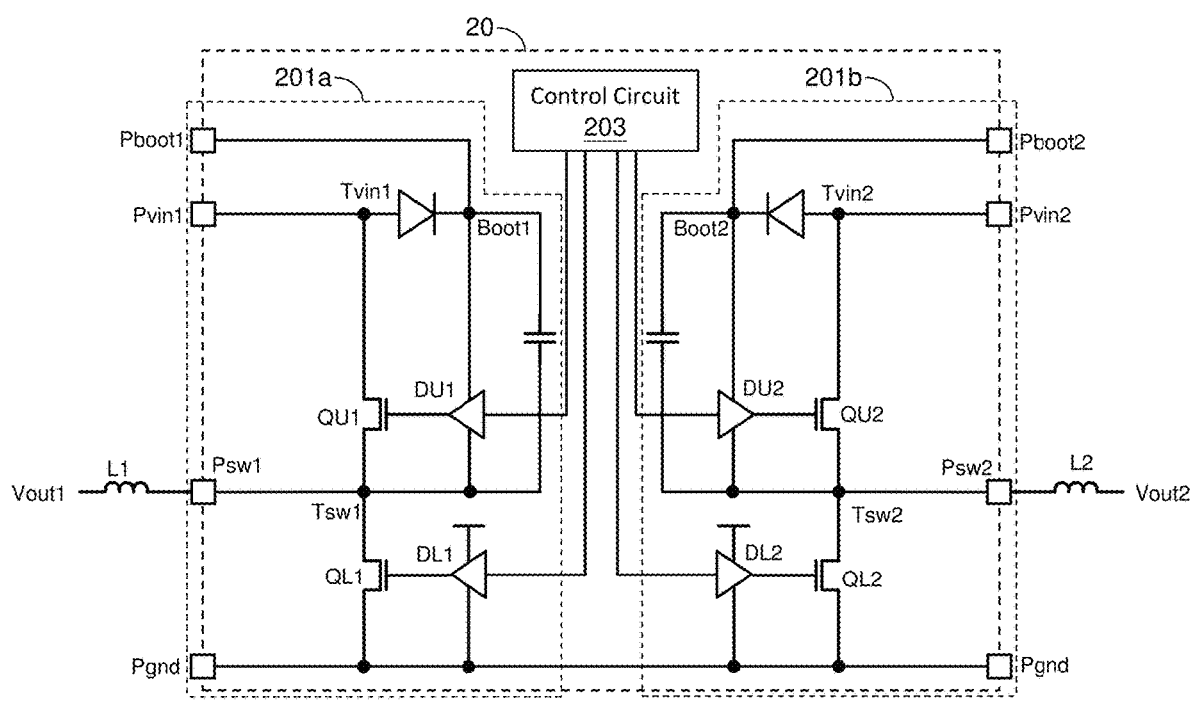
FIG. 6 shows a schematic circuit diagram of an exemplary PMIC according to a specific embodiment of the present invention.

FIG. 6 shows a schematic circuit diagram of an exemplary PMIC according to a specific exemplary embodiment of the present invention. In this embodiment, each of the first output stage circuit 201a and the second output stage circuit 201b is a switching output stage circuit. As shown in FIG. 6, in a separate power supply configuration, the first device includes: a high side switch QU1 and a low side switch QL1, whereas, the second device includes: a high side switch QU2 and a low side switch QL2. In the first device (in the first output stage circuit 201a), the high side switch QU1 of the first device is configured to operably drive a driver circuit DU1 and/or a current detection circuit corresponding to the first device, whereas, the low side switch QL1 of the first device is configured to operably drive a driver circuit DL1 and/or a current detection circuit corresponding to the first device. On the other hand, in the second device (in the second output stage circuit 201b), the high side switch QU2 of the second device is configured to operably drive a driver circuit DL2 and/or a current detection circuit corresponding to the second device, whereas, the low side switch QL2 of the second device is configured to operably drive a driver circuit DL2 and/or a current detection circuit corresponding to the second device. In one embodiment, a control circuit 203 serves to generate operation signals (not shown in FIG. 6) corresponding to the driver circuit DU1, the driver circuit DL1, the driver circuit DU2 and the driver circuit DL2, so as to control the driver circuit DU1, the driver circuit DL1, the driver circuit DU2 and the driver circuit DL2, respectively. As shown in FIG. 6, one end of the low side switch QL1 and one end of the high side switch QU1 are coupled to a current outflow end Tsw1, whereas, another end of the low side switch QL1 is coupled to a ground pin Pgnd. As shown in FIG. 6, in the separate power supply configuration, the first device is configured to operably control a corresponding inductor L1 according to a first feedback signal of the first output power Vout1, thus generating the first output power Vout1; on the other hand, the second device is configured to operably control a corresponding inductor L2 according to a second feedback signal of the second output power Vout2, thus generating the second output power Vout2.

Figure 7:
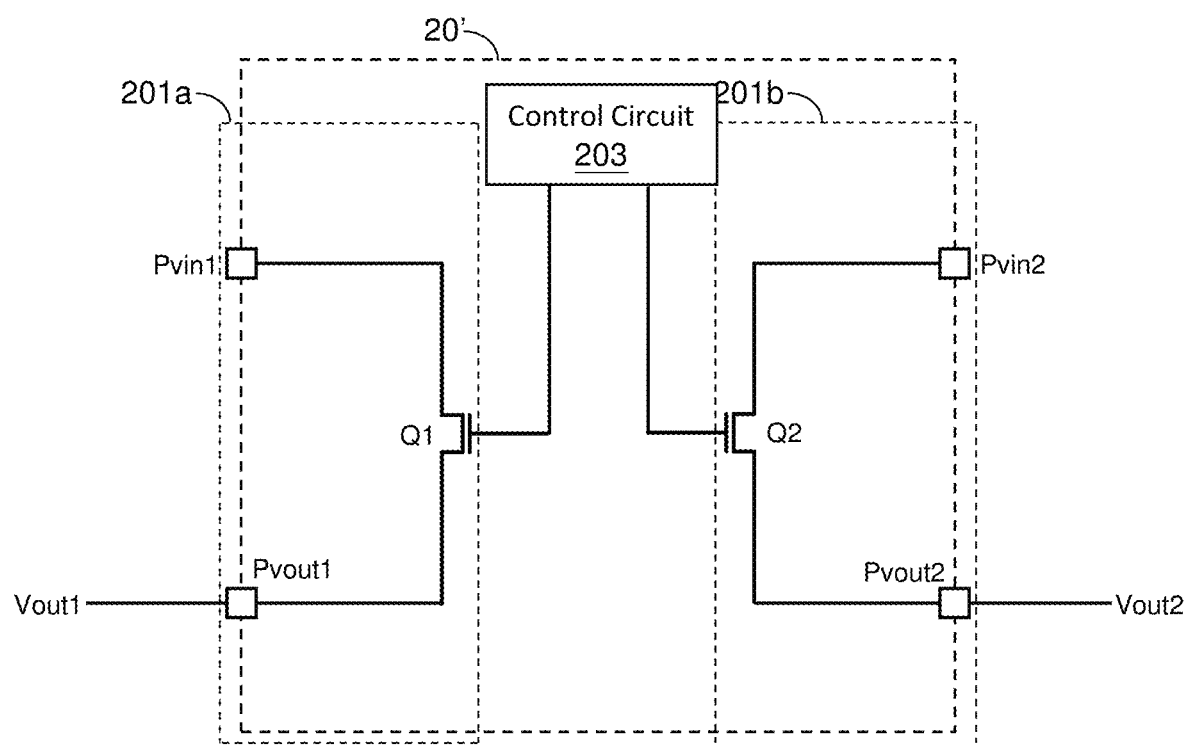
FIG. 7 shows a schematic circuit diagram of an exemplary PMIC according to another specific embodiment of the present invention.

FIG. 7 shows a schematic circuit diagram of an exemplary PMIC according to another specific exemplary embodiment of the present invention. In this embodiment, each of the first output stage circuit 201a and the second output stage circuit 201b is, for example but not limited to be, a linear power converter circuit. In this embodiment, as shown in FIG. 7, the first device can be a first transistor Q1, whereas, the second device can be a second transistor Q2. As shown in FIG. 7, in a separate power supply configuration, the first device and the second device are configured to operably generate the first output power Vout1 and the second output power Vout2 by linear regulation according to a first feedback signal of the first output power Vout1 and a second feedback signal of the second output power Vout2, respectively.

As shown in FIG. 5B, in the cooperation power supply configuration, the first device and the second device are connected in parallel to constitute a common transistor, wherein the common transistor is configured to operably generate a common output power Vout in accordance with a common feedback signal of the common output power Vout by linear regulation.

As described above, by coupling (e.g., by soldering) the first current inflow pin Pvin1 and the second current inflow pin Pvin2 to the common current inflow printed line Tins of the PCB and by coupling (e.g., by soldering) the first current outflow pin Psw1 and the second current outflow pin Psw2 to the common current outflow printed line Touts of the PCB, the present invention can efficiently arrange the space of the PCB and are well able to fulfill different demands for different corresponding powers.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power management integrated circuit (PMIC), which is soldered onto a printed circuit board (PCB); the PMIC comprising:
   a first output stage circuit; and
   a second output stage circuit;
   wherein in a separate power supply configuration, a first current inflow pin of the first output stage circuit and a second current inflow pin of the second output stage circuit are soldered to a first current inflow printed line of the PCB and a second current inflow printed line of the PCB, respectively, wherein the first current inflow printed line and the second current inflow printed line of the PCB are not directly electrically connected to each other, whereas, a first current outflow pin of the first output stage circuit and a second current outflow pin of the second output stage circuit are soldered to a first current outflow printed line of the PCB and a second current outflow printed line of the PCB, respectively, wherein the first current outflow printed line and the second current outflow printed line of the PCB are not directly electrically connected to each other; and
   wherein a first device and a second device are configured to operably generate a first output power corresponding to the first current outflow pin and a second output power corresponding to the second current outflow pin according to a first input power corresponding to the first current inflow pin and a second input power corresponding to the second current inflow pin, respectively, wherein a current upper limit of the first output power and a current upper limit of the second output power are a first maximum output current and a second maximum output current, respectively;
   wherein in a cooperation power supply configuration, the first current inflow pin and the second current inflow pin are both soldered to a common current inflow printed line of the PCB, so that the first current inflow pin and the second current inflow pin are electrically connected with each other, whereas, the first current outflow pin and the second current outflow pin are both soldered to a common current outflow printed line of the PCB, so that the first current outflow pin and the second current outflow pin are electrically connected with each other, whereby the first device and the second device are connected in parallel to each other, and whereby the first output stage circuit and the second output stage circuit constitute a cooperation output stage circuit, which is configured to operably generate a common output power, wherein a current upper limit of common output power is a sum of the first maximum output current plus the second maximum output current;
   wherein a first current inflow end and a first current outflow end of the first device respectively correspond to the first current inflow pin and the first current outflow pin, whereas, a second current inflow end and a second current outflow end of the second device respectively correspond to the second current inflow pin and the second current outflow pin.

2. The PMIC as claimed in claim 1, wherein both the common current inflow printed line and the common current outflow printed line are situated below the PMIC, and both the common current inflow printed line and the common current outflow printed line are situated between the PMIC and the PCB.

3. The PMIC as claimed in claim 2, wherein the common current inflow printed line and/or the common current outflow printed line is situated on and in contact with an uppermost surface of the PCB.

4. The PMIC as claimed in claim 3, wherein both the first current inflow pin and the second current inflow pin are situated on a same plane, such that the common current inflow printed line is situated on and in contact with the uppermost surface of the PCB, and/or, wherein both the first current outflow pin and the second current outflow pin are situated on a same plane, such that the common current outflow printed line is situated on and in contact with the uppermost surface of the PCB.

5. The PMIC as claimed in claim 4, wherein along a width direction of the PMIC, the first current inflow pin and the second current inflow pin are respectively situated on two sides of the PMIC, and, along a length direction of the PMIC, the first current inflow pin and the second current inflow pin are aligned to each other, so that the common current inflow printed line is situated on and in contact with the uppermost surface of the PCB, and/or, wherein along the width direction of the PMIC, the first current outflow pin and the second current outflow pin are respectively situated on two sides of the PMIC, and, along the length direction of the PMIC, the first current outflow pin and the second current outflow pin are aligned to each other, so that the common current outflow printed line is situated on and in contact with the uppermost surface of the PCB.

6. The PMIC as claimed in claim 5, wherein along a length direction of the PMIC, the common current inflow printed line is aligned with the first current inflow pin and the second current inflow pin which are situated on the same plane, and/or, along a length direction of the PMIC, the common current outflow printed line is aligned with the first current outflow pin and the second current outflow pin which are situated on the same plane.

7. The PMIC as claimed in claim 1, wherein each of the first output stage circuit and the second output stage circuit is a linear power converter circuit, wherein:
   in the separate power supply configuration, the first device and the second device correspond to a first transistor and a second transistor, respectively, wherein the first device and the second device are configured to operably generate the first output power and the second output power in accordance with a first feedback signal of the first output power and a second feedback signal of the second output power to achieve linear regulation, respectively; and
   in the cooperation power supply configuration, the first device and the second device are connected in parallel to constitute a common transistor, wherein the common transistor is configured to operably generate the common output power according to a common feedback signal of the common output power to achieve linear regulation.

8. The PMIC as claimed in claim 1, wherein each of the first output stage circuit and the second output stage circuit is a switching output stage circuit, wherein:
   in the separate power supply configuration, each of the first device and the second device includes: a corresponding high side switch and a corresponding low side switch;
   wherein the high side switch of the first device is configured to operably drive a driver circuit and/or a current detection circuit corresponding to the first device, whereas, the low side switch of the first device is configured to operably drive a driver circuit and/or a current detection circuit corresponding to the first device;
   wherein the high side switch of the second device is configured to operably drive a driver circuit and/or a current detection circuit corresponding to the second device, whereas, the low side switch of the second device is configured to operably drive a driver circuit and/or a current detection circuit corresponding to the second device;
   wherein the high side switch and the low side switch of the first device is configured to operably control a corresponding first inductor according to a first feedback signal of the first output power, thus generating the first output power;
   wherein the high side switch and the low side switch of the second device is configured to operably control a corresponding second inductor according to a second feedback signal of the second output power, thus generating the second output power; and
   in the cooperation power supply configuration, the first device and the second device are configured to operably control an inductor in accordance with a common feedback signal of the common output power, thus generating the common output power.

9. The PMIC as claimed in claim 8, wherein:
   in the separate power supply configuration, via the first current inflow printed line and the first current outflow printed line, respectively, the first current inflow pin and the first current outflow pin are electrically connected to a first input voltage and a first switching node, respectively, whereas, via the second current inflow printed line and the second current outflow printed line, respectively, the second current inflow pin and the second current outflow pin are electrically connected to a second input voltage and a second switching node, respectively; and
   in the cooperation power supply configuration, via the common current inflow printed line and the common current outflow printed line, respectively, the first current inflow pin and the first current outflow pin are electrically connected to a common input voltage and a common switching node, respectively, whereas, via the common current inflow printed line and the common current outflow printed line, respectively, the second current inflow pin and the second current outflow pin are electrically connected to the common input voltage and the common switching node, respectively.

10. A power management system, comprising a power management integrated circuit (PMIC) and a printed circuit board (PCB), wherein the PMIC is soldered onto the PCB; the PMIC comprising:
   a first output stage circuit; and
   a second output stage circuit;
   wherein in a separate power supply configuration, a first current inflow pin of the first output stage circuit and a second current inflow pin of the second output stage circuit are soldered to a first current inflow printed line of the PCB and a second current inflow printed line of the PCB, respectively, wherein the first current inflow printed line and the second current inflow printed line of the PCB are not directly electrically connected to each other, whereas, a first current outflow pin of the first output stage circuit and a second current outflow pin of the second output stage circuit are soldered to a first current outflow printed line of the PCB and a second current outflow printed line of the PCB, respectively, wherein the first current outflow printed line and the second current outflow printed line of the PCB are not directly electrically connected to each other; and
   wherein a first device and a second device are configured to operably generate a first output power corresponding to the first current outflow pin and a second output power corresponding to the second current outflow pin according to a first input power corresponding to the first current inflow pin and a second input power corresponding to the second current inflow pin, respectively, wherein a current upper limit of the first output power and a current upper limit of the second output power are a first maximum output current and a second maximum output current, respectively;
   wherein in a cooperation power supply configuration, the first current inflow pin and the second current inflow pin are both soldered to a common current inflow printed line of the PCB, so that the first current inflow pin and the second current inflow pin are electrically connected with each other, whereas, the first current outflow pin and the second current outflow pin are both soldered to a common current outflow printed line of the PCB, so that the first current outflow pin and the second current outflow pin are electrically connected with each other, whereby the first device and the second device are connected in parallel to each other, and whereby the first output stage circuit and the second output stage circuit constitute a cooperation output stage circuit, which is configured to operably generate a common output power, wherein a current upper limit of common output power is a sum of the first maximum output current plus the second maximum output current;

wherein a first current inflow end and a first current outflow end of the first device respectively correspond to the first current inflow pin and the first current outflow pin, whereas, a second current inflow end and a second current outflow end of the second device respectively correspond to the second current inflow pin and the second current outflow pin.

11. The power management system as claimed in claim 10, wherein both the common current inflow printed line and the common current outflow printed line are situated below the PMIC, and both the common current inflow printed line and the common current outflow printed line are situated between the PMIC and the PCB.

12. The power management system as claimed in claim 11, wherein the common current inflow printed line and/or the common current outflow printed line is situated on and in contact with an uppermost surface of the PCB.

13. The power management system as claimed in claim 12, wherein both the first current inflow pin and the second current inflow pin are situated on a same plane, such that the common current inflow printed line is situated on and in contact with the uppermost surface of the PCB, and/or, wherein both the first current outflow pin and the second current outflow pin are situated on a same plane, such that the common current outflow printed line is situated on and in contact with the uppermost surface of the PCB.

14. The power management system as claimed in claim 13, wherein along a width direction of the PMIC, the first current inflow pin and the second current inflow pin are respectively situated on two sides of the PMIC, and, along a length direction of the PMIC, the first current inflow pin and the second current inflow pin are aligned to each other, so that the common current inflow printed line is situated on and in contact with the uppermost surface of the PCB, and/or, wherein along the width direction of the PMIC, the first current outflow pin and the second current outflow pin are respectively situated on two sides of the PMIC, and, along the length direction of the PMIC, the first current outflow pin and the second current outflow pin are aligned to each other, so that the common current outflow printed line is situated on and in contact with the uppermost surface of the PCB.

15. The power management system as claimed in claim 14, wherein along a length direction of the PMIC, the common current inflow printed line is aligned with the first current inflow pin and the second current inflow pin which are situated on the same plane, and/or, along a length direction of the PMIC, the common current outflow printed line is aligned with the first current outflow pin and the second current outflow pin which are situated on the same plane.

16. The power management system as claimed in claim 10, wherein each of the first output stage circuit and the second output stage circuit is a linear power converter circuit, wherein:

in the separate power supply configuration, the first device and the second device correspond to a first transistor and a second transistor, respectively, wherein the first device and the second device are configured to operably generate the first output power and the second output power in accordance with a first feedback signal of the first output power and a second feedback signal of the second output power to achieve linear regulation, respectively; and in the cooperation power supply configuration, the first device and the second device are connected in parallel to constitute a common transistor, wherein the common transistor is configured to operably generate the common output power according to a common feedback signal of the common output power to achieve linear regulation.

17. The power management system as claimed in claim 10, wherein each of the first output stage circuit and the second output stage circuit is a switching output stage circuit, wherein:

in the separate power supply configuration, each of the first device and the second device includes: a corresponding high side switch and a corresponding low side switch;

wherein the high side switch of the first device is configured to operably drive a driver circuit and/or a current detection circuit corresponding to the first device, whereas, the low side switch of the first device is configured to operably drive a driver circuit and/or a current detection circuit corresponding to the first device;

wherein the high side switch of the second device is configured to operably drive a driver circuit and/or a current detection circuit corresponding to the second device, whereas, the low side switch of the second device is configured to operably drive a driver circuit and/or a current detection circuit corresponding to the second device;

wherein the high side switch and the low side switch of the first device is configured to operably control a corresponding first inductor according to a first feedback signal of the first output power, thus generating the first output power;

wherein the high side switch and the low side switch of the second device is configured to operably control a corresponding second inductor according to a second feedback signal of the second output power, thus generating the second output power; and in the cooperation power supply configuration, the first device and the second device are configured to operably control an inductor in accordance with a common feedback signal of the common output power, thus generating the common output power.

18. The power management system as claimed in claim 17, wherein:

in the separate power supply configuration, via the first current inflow printed line and the first current outflow printed line, respectively, the first current inflow pin and the first current outflow pin are electrically connected to a first input voltage and a first switching node, respectively, whereas, via the second current inflow printed line and the second current outflow printed line, respectively, the second current inflow pin and the second current outflow pin are electrically connected to a second input voltage and a second switching node, respectively; and in the cooperation power supply configuration, via the common current inflow printed line and the common current outflow printed line, respectively, the first current inflow pin and the first current outflow pin are electrically connected to a common input voltage and a common switching node, respectively, whereas, via the common current inflow printed line and the common current outflow printed line, respectively, the second current inflow pin and the second current outflow pin are electrically connected to the common input voltage and the common switching node, respectively.

* * * * *